US008819256B2

(12) United States Patent
Krig

(10) Patent No.: US 8,819,256 B2
(45) Date of Patent: Aug. 26, 2014

(54) METHOD AND SYSTEM FOR DEVICE PROPERTY FOR SPECIFICATION OF VENDOR SPECIFIC PROTOCOL FEATURES

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 759 days.

(21) Appl. No.: 12/195,248

(22) Filed: Aug. 20, 2008

(65) Prior Publication Data

US 2009/0182892 A1 Jul. 16, 2009

Related U.S. Application Data

(60) Provisional application No. 61/021,480, filed on Jan. 16, 2008, provisional application No. 61/073,922, filed on Jun. 19, 2008.

(51) Int. Cl.
*G06F 15/16* (2006.01)
*H04L 12/28* (2006.01)

(52) U.S. Cl.
USPC .......................... 709/230; 709/227; 370/389

(58) Field of Classification Search
CPC ...................................................... G06F 15/16
USPC ........................................................ 709/230
See application file for complete search history.

(56) References Cited

U.S. PATENT DOCUMENTS

| | | | |
|---|---|---|---|
| 7,107,342 B1 * | 9/2006 | Holur et al. ................. 709/225 |
| 7,231,456 B1 * | 6/2007 | Chiba et al. ................. 709/236 |
| 7,502,820 B2 * | 3/2009 | Manders et al. ............. 709/203 |
| 7,555,554 B2 * | 6/2009 | Manders et al. ............. 709/227 |
| 7,673,020 B2 * | 3/2010 | Rosenbloom et al. ....... 709/220 |
| 7,724,796 B2 * | 5/2010 | Forrest et al. ............ 372/46.01 |
| 8,401,881 B2 * | 3/2013 | Weinstock et al. ............... 705/6 |
| 8,675,647 B1 * | 3/2014 | Luciani ........................ 370/389 |
| 2004/0221044 A1 * | 11/2004 | Rosenbloom et al. ....... 709/227 |
| 2006/0031545 A1 * | 2/2006 | Manders et al. ............. 709/230 |
| 2007/0046562 A1 * | 3/2007 | Polivy et al. ................. 345/1.2 |
| 2007/0189279 A1 * | 8/2007 | Thalanany et al. .......... 370/356 |
| 2007/0242633 A1 * | 10/2007 | Roberts et al. .............. 370/312 |
| 2009/0017756 A1 * | 1/2009 | Tsfaty et al. ................ 455/41.2 |
| 2009/0031258 A1 * | 1/2009 | Arrasvuori et al. .......... 715/863 |
| 2009/0083764 A1 * | 3/2009 | Davis et al. ................. 719/321 |
| 2010/0093278 A1 * | 4/2010 | Abel et al. .................. 455/41.1 |

* cited by examiner

*Primary Examiner* — Guang Li
(74) *Attorney, Agent, or Firm* — Brinks Gilson & Lione

(57) ABSTRACT

One or more vendor extensions that may be communicated to and/or from a device that may communicate via media transfer protocol (MTP) may be specified within an extension of the MTP. The vendor extension may comprise vendor specific information such as proprietary supported features. Vendor extensions may be indicated as a device property and may be communicated to another device during initiation of communication. Supported vendor extensions may be specified in an MTP DevicePropDesc dataset as a response to a request such as a MTP GetDevicePropDesc operation. Alternatively, data from a current value field of an MTP DevicePropDesc dataset may be returned in response to a GetDevicePropValue operation. An MTP SetDevicePropValue operation may be utilized for selecting a vendor extension. However, the selection may be accepted or rejected by a device. An event may be issued to other devices when a change of vendor extension has occurred.

30 Claims, 4 Drawing Sheets

METHOD AND SYSTEM FOR DEVICE PROPERTY FOR SPECIFICATION OF VENDOR SPECIFIC PROTOCOL FEATURES

CROSS-REFERENCE TO RELATED APPLICATIONS/INCORPORATION BY REFERENCE

This application makes reference to, claims priority to, and claims the benefit of U.S. Provisional Application Ser. No. 61/021,480, filed on Jan. 16, 2008, entitled "METHOD AND SYSTEM FOR DEVICE PROPERTY FOR SPECIFICATION OF VENDOR SPECIFIC PROTOCOL FEATURES," which is incorporated herein by reference in their entirety.

This application makes reference to, claims priority to, and claims the benefit of U.S. Provisional Application Ser. No. 61/073,922, filed on Jun. 19, 2008, entitled "METHOD AND SYSTEM FOR DEVICE PROPERTY FOR SPECIFICATION OF VENDOR SPECIFIC PROTOCOL FEATURES," which is incorporated herein by reference in their entirety.

FIELD OF THE INVENTION

Certain embodiments of the invention relate to multimedia communication. More specifically, certain embodiments of the invention relate to a method and system for device property for specification of vendor specific protocol features.

BACKGROUND OF THE INVENTION

The media transfer protocol (MTP) is an extension of the industry standard picture transfer protocol (PTP). The media transfer protocol was created as an extension to the picture transfer protocol specifically for media devices and includes various provisions for digital rights management (DRM).

Digital rights management (DRM) and electronic license management technologies may be utilized for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

PIMA 15740:2000 provides a common communication mechanism for exchanging images with and between digital still photography devices (DSPDs). This includes communication between digital still photography devices and host computers, printers, other digital still devices, telecommunications kiosks, and image storage and display devices. This standard presents a protocol that is intended to be transport and platform independent. The purpose of this intent is to enable standard behavior by allowing implementation of the protocol in a variety of standard transports. Exemplary transports include USB (Universal Serial Bus), IEEE 1394, and IrDA (Infrared Data Association). This standard specifies the following:

Behavior requirements for DSPDs include: baseline features a device needs to support to provide interoperability over conforming transports; functional requirements needed by a transport to enable the creation of a transport-dependent implementation specification that conforms to this standard; and a high-level protocol for communicating with and between DSPDs consisting of operation, data, and response phases.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for device property for specification of vendor specific protocol features, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for device property for specification of vendor specific protocol features. Aspects of the method and system may enable utilization of vendor extensions of the MTP wherein the vendor extensions may comprise proprietary communication protocol features and/or protocol features that may be undefined by the MTP. In this regard, an extension of the MTP may enable specifying one or more vendor extensions for communicating to and/or from an MTP enabled device. For example, a new MTP device property description may be defined within an extension of the standard MTP that may comprise vendor extension information and may enable devices to communicate their support of one or more protocol features outside of the MTP specification. Exemplary vendor extensions may enable a plurality of protocol features such as one or more digital rights management (DRM) protocols and/or one or more geo-location protocols, for example. In this regard, a first device may communicate which vendor extensions it supports to a second device, and/or vice-versa, upon initiation of communication. Since vendor extensions may be represented as a device property within MTP operations, a device may request utilization or support of one or more vendor extensions in a second device via a SetDevicePropValue operation. Subsequently, the second device may choose to accept or reject the requested vendor extension. When a vendor extension as a device property value is changed by a SetDevicePropValue operation request, other devices may be alerted to the change event. Also, a device may retrieve vendor extensions supported by a second device via a GetDevicePropDesc operation or a GetDevicePropValue operation. In this manner, the second device may communicate vendor extension information by retuning, respectively, an MTP DevicePropDesc dataset or more succinctly, an array of vendor extension data from the current value field of the DevicePropDesc data set.

Figure 1:
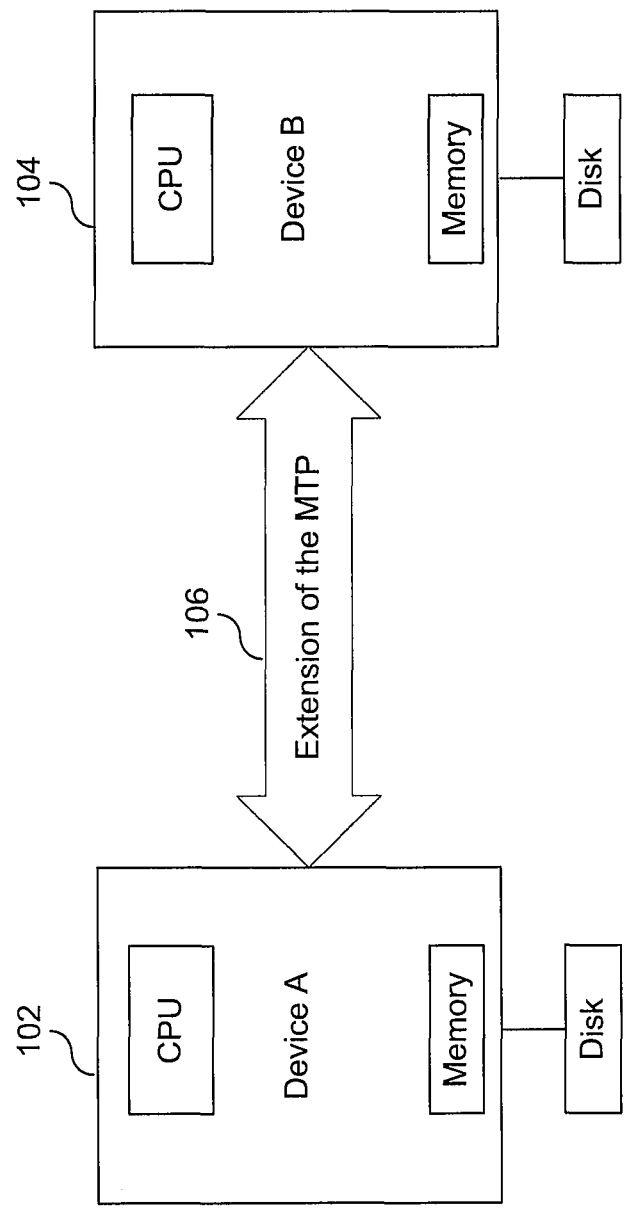
FIG. 1 is a block diagram of an exemplary system comprising a plurality of devices which are communicatively coupled and may communicate vendor extension information via an extension of the standard MTP, in accordance with an embodiment of the invention.

FIG. 1 is a block diagram of an exemplary system comprising a plurality of devices which are communicatively coupled and may communicate vendor extension information via an extension of the standard MTP, in accordance with an embodiment of the invention. Referring to FIG. 1 there is shown an extension of the standard MTP 106 that may facilitate communication between a device 102 and a device 104.

The device 102 may comprise suitable logic, circuitry and/or code that may enable transfer of information to and from the device 104 via MTP and an extension of the standard MTP 106. In various embodiments of the invention, the device 102 may enable one or more vendor specific protocol features via one or more vendor extensions to standard MTP. Moreover, the device 102 may be, for example, a host computer that may be enabled to function as an initiator device with regard to MTP operations.

The device 104 may comprise suitable logic, circuitry, and/or code that may enable transfer of information to and from the device 102 via MTP and an extension of the standard MTP 106. In various embodiments of the invention, the device 104 may enable one or more vendor specific protocol features via one or more vendor extensions to standard MTP. Moreover, the device 104 may be, for example, a handheld device that may be enabled to function as a responder device with regard to MTP operations The extension of the standard MTP 106 may comprise modified specifications within the MTP architecture that may enable a method for communicating vendor extension information between the device 102 and device 104. In this regard, the extension to the standard MTP 106 may for example add a device property to the existing MTP object property descriptions for communicating vendor extension strings and/or any other vendor specific protocol information. In some embodiments of the invention, multiple protocol features may be defined within a single vendor extension. An indicator of vendor extensions and/or vendor specific protocol information may be established by adding to the Device Properties specification, a new device property description which may be named, for example, VendorExtensionInformation property and may appear in the MTP specification as shown in Table 1. In various embodiments of the invention, a set of MTP vendor extensions may be represented by a comma separated list, for example, "drm-safe, extension9". The VendorExtensionInformation property may be a device property that specifies vendor extensions that may be utilized to enable features within the devices 102 and/or 104.

TABLE 1

VendorExtensionInformation Property

| Field name | Field order | Size (bytes) | Datatype | Value |
| --- | --- | --- | --- | --- |
| PropertyCode | 1 | 2 | UINT16 | 0xDXXX |
| Datatype | 2 | 2 | UINT16 | 0x4002 (AUINT8) |
| Get/Set | 3 | 1 | UINT8 | 0x01 (GET/SET) |
| DefaultValue | 4 | | | 0x00 (Null String) |
| GroupCode | 5 | 4 | UINT32 | Device-defined |
| FormFlag | 6 | 1 | UINT8 | 0x00 None |

In operation, device 102 shown in FIG. 1 may be a host computer attempting to download media content to a device 104 utilizing the one or more extensions of the MTP 106. Prior to downloading the media content, the device 102 may query the device 104 to determine which digital rights management protocol the device 104 is enabled to utilize. In one embodiment of the invention, the device 102 may send a GetDevicePropDesc or a GetDevicePropValue operation request to the device 104. Respective to the operation that was sent, the device 104 may respond with the entire DevicePropDesc dataset as shown in Table 2, or just the current value for the VendorExtensionInformation property from the DevicePropDesc dataset. In some exemplary embodiments of the invention, a device property may comprise an array of unsigned integers which may utilize 65,000 characters such that a large number of vendor specific protocol features may be specified in a string. The device 102 may then utilize, for example, a DRM protocol indicated by the device 104 DevicePropDesc dataset to implement DRM for the download of media content. Since MTP Device Properties may be read-only or read-write, the device 102 may attempt to change to a different vendor extension. In this regard, the device 102 may send a SetDevicePropValue operation request to the device 104. The device 104 may accept or reject the the requested vendor extension.

TABLE 2

Device Property Describing Dataset

| Field name | Field order | Size (bytes) | Datatype | Description |
| --- | --- | --- | --- | --- |
| Device Property Code | 1 | 2 | UINT16 | A specific device property code. |
| Datatype | 2 | 2 | UINT16 | Identifies the data type code of the property, as defined in section 3.2 Simple Types |
| Get/Set | 3 | 1 | UINT8 | Indicates whether the property is read-only (Get), or read-write (Get/Set). 0x00 Get 0x01 Get/Set |
| Factory Default Value | 4 | DTS | DTS | Identifies the value of the factory default for the property. |
| Current Value | 5 | DTS | DTS | Identifies the current value of this property. |
| Form Flag | 6 | 1 | UINT8 | Indicates the format of the next field. 0x00 None. This is for properties like DateTime. In this case the FORM field is not present. 0x01 Range-Form 0x02 Enumeration-Form |
| FORM | N/A | <variable> | — | This dataset depends on the Form Flag, and is absent if Form Flag = 0x00. |

In various embodiments of the invention, in addition to utilizing the VendorExtensionInformation Property of the extension of the standard MTP 106, the device 102 may query the device 104 for vendor extension information via a GetDeviceInfo operation. In this regard, the device 104 may respond with a block of information called DeviceInfo dataset that may comprise an MTP vendor extension ID, however, the MTP vendor extension ID may comprise less information than the DevicePropertyDesc data set. In addition, the DeviceInfo dataset may comprise an array of Device Property codes which may indicate that the VendorExtensionInformation property may be supported by the device 104.

Figure 2:
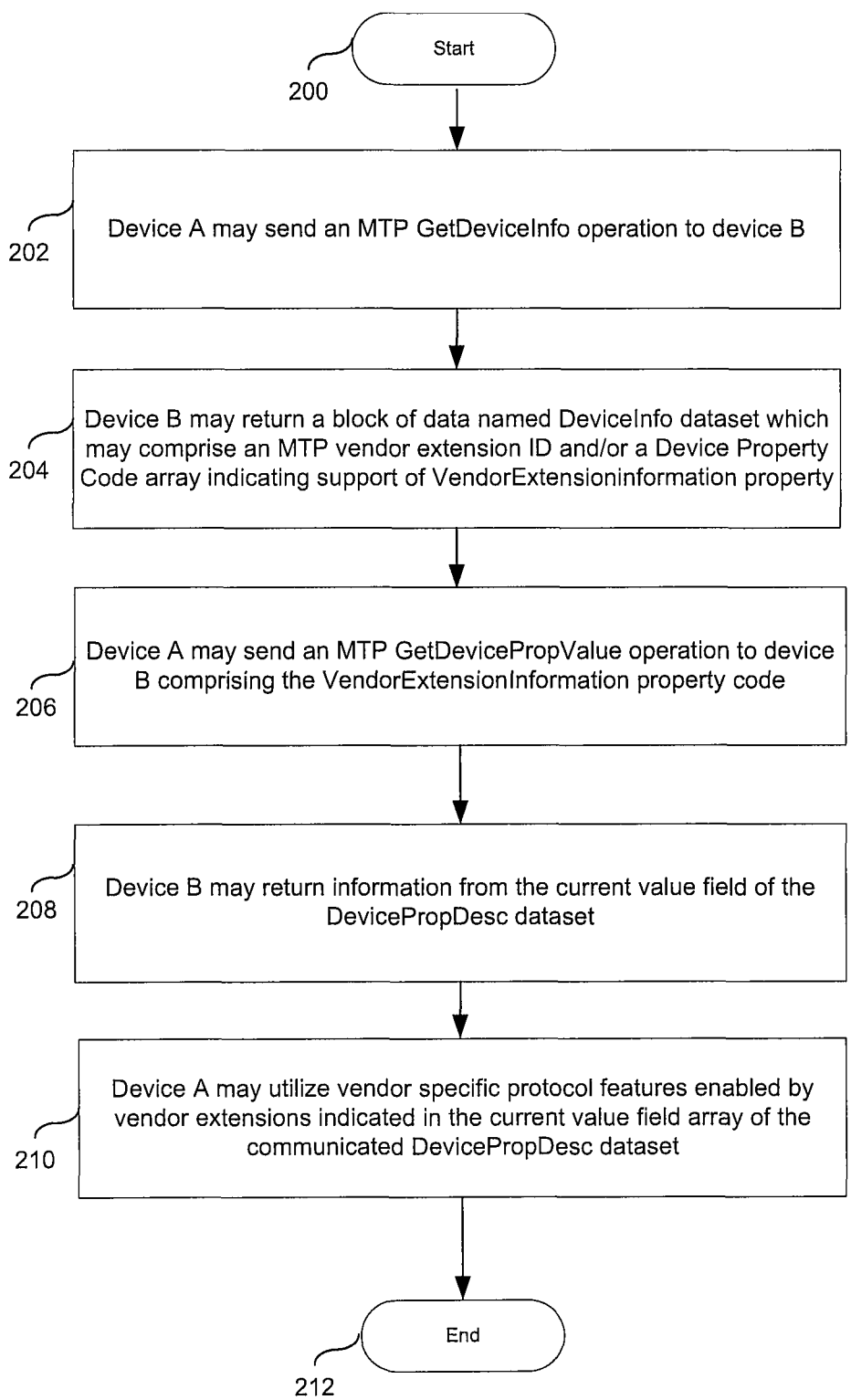
FIG. 2 is a flow chart illustrating exemplary steps utilizing DeviceInfo Dataset and GetDevicePropValue operations to determine supported vendor extensions, in accordance with an embodiment of the invention.

FIG. 2 is a flow chart illustrating exemplary steps utilizing DeviceInfo Dataset and GetDevicePropValue operations to determine supported vendor extensions, in accordance with an embodiment of the invention. Referring to FIG. 2, step 200 may be a start step. In step 202, device A 102 may send an MTP GetDeviceInfo operation to device B 104. In step 204, device B 104 may return a block of data named DeviceInfo dataset which may comprise an MTP vendor extension ID and/or a Device Property Code array indicating support of VendorExtensioninformation property. In step 206, device A 102 may send an MTP GetDevicePropValue operation to device B 104 comprising the VendorExtensionInformation property code. In step 208, device B 104 may return information from the current value field of the DevicePropDesc dataset. In step 210, device A 102 may utilize vendor specific protocol features enabled by vendor extensions indicated in the current value field array of the communicated DevicePropDesc dataset. The exemplary steps may end at step 212.

Figure 3:
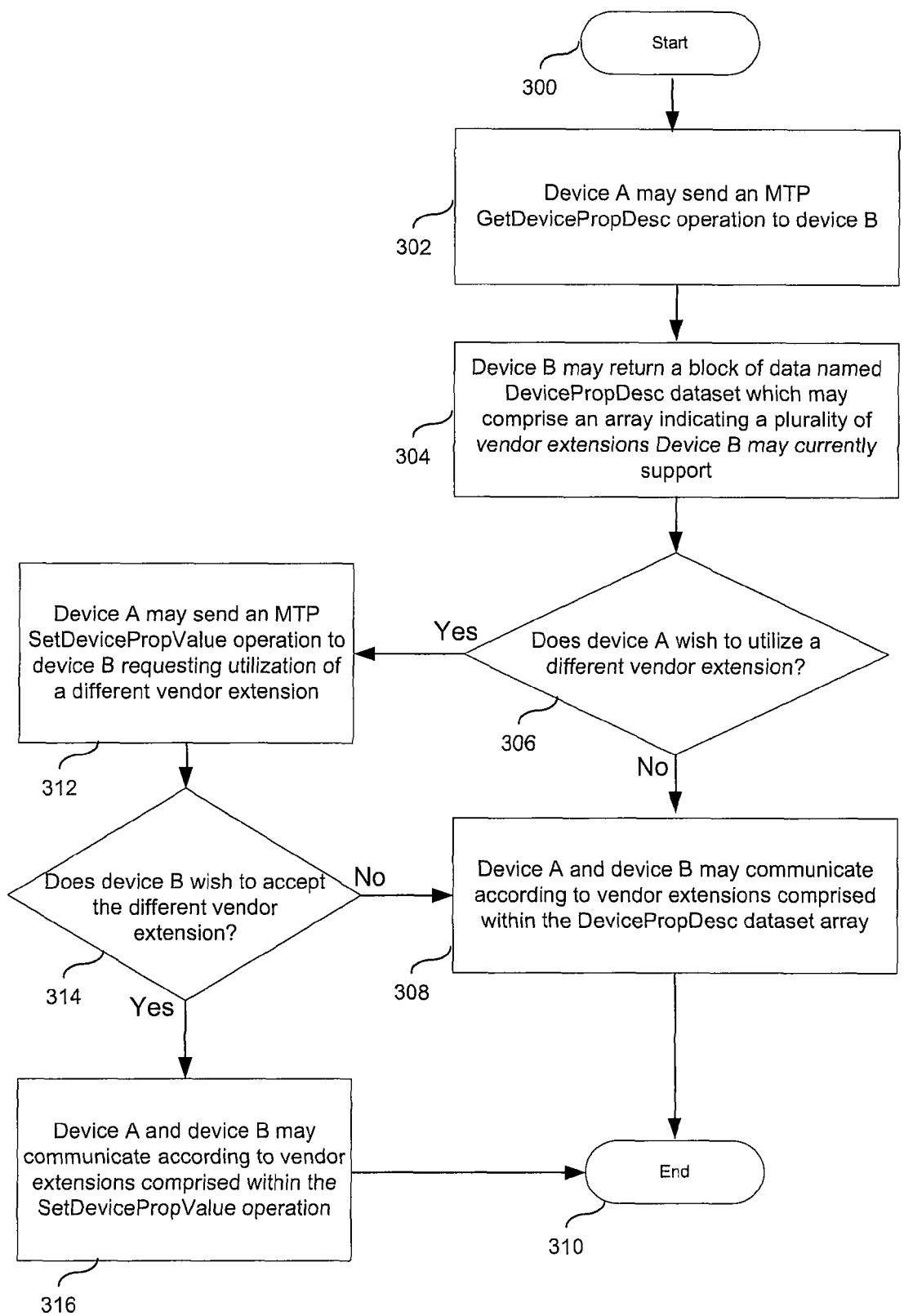
FIG. 3 is a flow chart illustrating exemplary steps utilizing Device Properties to indicate which vendor extensions are supported, in accordance with an embodiment of the invention.

FIG. 3 is a flow chart illustrating exemplary steps utilizing Device Properties to indicate which vendor extensions are supported, in accordance with an embodiment of the invention. Referring to FIG. 3, step 300 may be a Start step. In step 302, device A 102 may send an MTP GetDevicePropDesc operation to device B 104. In step 304, device B 104 may return a block of data named DevicePropDesc dataset which may comprise an array indicating a plurality of vendor extensions that Device B 104 may currently support. In step 306, it may be determined whether device A 102 wishes to change to a different vendor extension. In instances when the device A 102 does not wish to change to a different vendor extension, the exemplary steps may proceed to step 308. In step 308, device A 102 and device B 104 may communicate according to vendor extensions within the DevicePropDesc dataset array. Step 310 may be the end of exemplary steps. In step 306, in instances where device A 102 wishes to change to a different vendor extension, the exemplary steps may proceed to step 312. In step 312, device A 102 may send an MTP SetDevicePropValue operation to device B 104 requesting utilization of a different vendor extension. In step 314, in instances where device B 104 does not wish to accept the different vendor extension, the exemplary steps may proceed to step 308. In step 314, in instances where device B 104 wishes to accept the different vendor extension, the exemplary steps may proceed to step 316. In step 316, device A 102 and device B 104 may communicate according to vendor extensions comprised within the SetDevicePropValue operation. The exemplary steps may proceed to the End step 310.

In accordance with an exemplary embodiment of the invention, the device 102 may send a GetDevicePropDesc operation request to a device B 104 identifying the VendorExtensionInformation PropertyCode. In response to the GetDevicePropDesc operation, the device 104 may return a block of data named DevicePropDesc dataset comprising a current value of the VendorExtensionInformation property. In instances when the device A 102 does not wish to change the current value, the device A 102 may utilize the vendor specific protocol features identified in the current value of the VendorExtensionInformation property. In instances when the device A 102 wishes to change to different vendor extensions, the device A 102 may send a SetDevicePropValue operation request to the device B 104 comprising one or more different vendor extensions. The device B 104 may then determine whether to accept the different vendor extensions. In instances when the device B 104 decides to accept the different vendor extensions, then the device A 102 and device B 104 may communicate according to the different vendor extension protocols. In instances when the device B 104 does not wish to accept the different vendor extensions, the device A 102 and device B 104 may communicate via the vendor extensions communicated as the current value within DevicePropDesc dataset.

Figure 4:
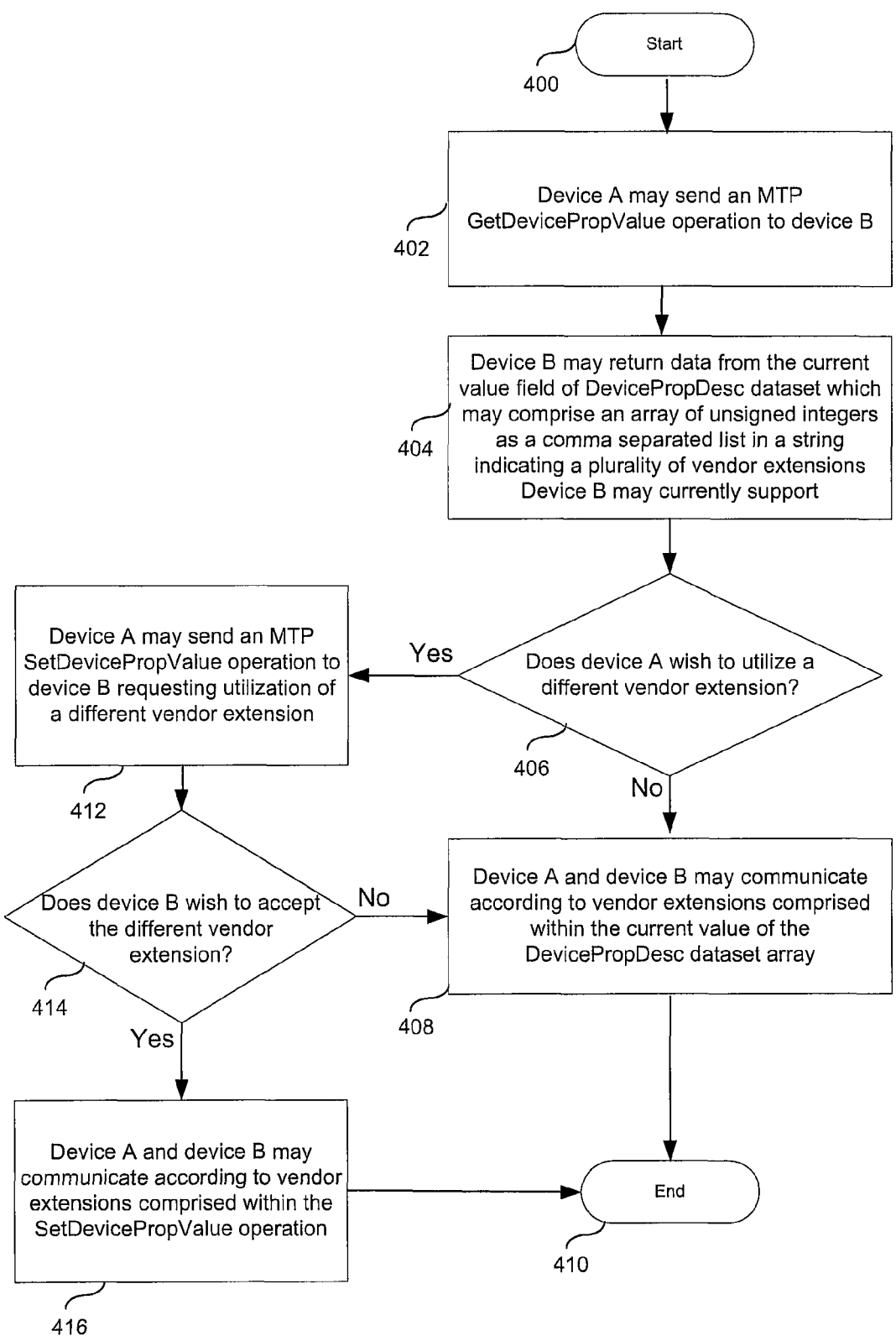
FIG. 4 is a flow chart illustrating exemplary steps utilizing Device Properties to indicate which vendor extensions are supported, in accordance with an embodiment of the invention.

FIG. 4 is a flow chart illustrating exemplary steps utilizing Device Properties to indicate which vendor extensions are supported, in accordance with an embodiment of the invention. Referring to FIG. 4, step 400 may be a start step. In step 402, device A 102 may send an MTP GetDevicePropValue operation to device B 104. In step 404, device B 104 may return data from the current value field of DevicePropDesc dataset which may comprise an array of unsigned integers indicating a plurality of vendor extensions Device B 104 may currently support. In step 406, it may be determined whether device A 102 wishes to change to a different vendor extension. In instances when device A 102 does not wish to utilize a different vendor extension, proceed to step 408. In step 408, device A 102 and device B 104 may communicate according to vendor extensions comprised within the current value of the DevicePropDesc dataset array. Step 410 may be the end of exemplary steps.

In step 406, in instances when device A 102 wishes to utilize one or more different vendor extensions, proceed to step 412. In step 412, device A 102 may send an MTP SetDevicePropValue operation to device B 104 requesting utilization of a different vendor extension. In step 414, in instances when device B 104 does not wish to accept a different vendor extension, the exemplary steps may proceed to step 408. In step 414, in instances when device B 104 wishes to accept the different vendor extension, the exemplary steps may proceed to step 416. In step 416, device A 102 and device B 104 may communicate according to vendor extensions indicated within the SetDevicePropValue operation.

In a method and system for indicating vendor extensions for media transfer protocol (MTP), one or more vendor extensions for communication based on vendor specific protocol features, to and/or from a device B 104 that may communicate via the MTP, may be specified in one or more extensions of media transfer protocol (MTP) 106. The supported vendor extensions for the device B 104 communication protocols may be indicated as a Device Property within the extensions of the MTP 106. In addition, vendor extensions may be indicated using a field within a DeviceInfo dataset. The device B 104 may communicate current vendor extension values to another device A 102 upon initiation of communication or in response to an operation request such as GetDevicePropDesc, GetDevicePropValue and/or GetDeviceInfo. The response from device B 104 may comprise an MTP DevicePropDesc dataset, the current value for vendor extensions from the DevicePropDesc dataset or DeviceInfo dataset for example. The device A 102 may request utilization of a specified vendor extension via a SetDevicePropValue operation. A vendor extension that differs from the current value of the DevicePropDesc dataset may be selected for communication utilizing different vendor specific protocol features to and/or from the device B 104. An event may be issued to indicate when changes to the vendor extensions occur.

Various embodiments of the invention provide a method and system for communicating multimedia information. One or more vendor extensions for communicating to and/or from an MTP enabled device B 104 may be specified within an extension of the MTP 106. The one or more vendor extensions may be indicated as a device property within the extension of the MTP 106. In this regard, the device B 104 may communicate the vendor extensions to another device A 102, and/or vice-versa, during initiation of communication. Moreover, vendor extensions may be specified in a response to a request. For example, a request may comprise an MTP Get- DevicePropDesc operation and the response may comprise an MTP DevicePropDesc dataset. Another exemplary request may comprise a GetDevicePropValue operation wherein the response may comprise data from a current value field of an MTP DevicePropDesc dataset. In addition, a vendor extension may be selected for communicating to and/or from the device B 104, via an MTP SetDevicePropValue operation. However, the device B 104 may accept or reject the selected vendor extension. In various embodiments of the invention, an event may be issued to other devices when a change of vendor extension has occurred.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for device property for specification of vendor specific protocol features.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communicating multimedia information, the method comprising:
    specifying, by a circuitry, information associated with a vendor extension of a media transfer protocol (MTP), said information including features enabled by said vendor extension;
    alerting, by said circuitry, a device of said information to allow said device to accept or reject said vendor extension, said device configured to communicate via said MTP, and said alerting occurring via an MTP dataset that includes device properties and an array of unsigned integers in a string indicating said vendor extension and at least one other extension said device supports; and
    transmitting, by said circuitry, said vendor extension that said device accepts.

2. The method according to claim 1, comprising indicating said information as a device property within said vendor extension of said MTP.

3. The method according to claim 1, comprising communicating said information to another device when said device initiates communication with said another device.

4. The method according to claim 1, comprising specifying said information in response to a request.

5. The method according to claim 4, wherein said request comprises an MTP operation configured to retrieve said device properties.

6. The method according to claim 4, wherein said response comprises said MTP dataset including said device properties.

7. The method according to claim 4, wherein said request comprises an MTP operation configured to retrieve device property values.

8. The method according to claim 4, wherein said response comprises data from a current value field of said MTP dataset including said device properties.

9. The method according to claim 1, comprising one or both of:
    selecting said vendor extension for communicating to or from said device via an MTP operation configured to set device property values; and
    communicating to or from said device based on said information.

10. The method according to claim 1, comprising issuing an event to indicate when a change to said vendor extension occurs.

11. A system for communicating multimedia information, the system comprising:
    circuitry is configured to specify information associated with a vendor extension of a media transfer protocol (MTP), said information including features enabled by said vendor extension;
    said circuitry is configured to alert a device of said information to allow said device to accept or reject said vendor extension, said device configured to communicate via said MTP, and said alerting occurring via an MTP dataset that includes device properties and an array of unsigned integers in a string indicating said vendor extension and at least one other vender extension said device supports; and
    said circuitry is configured to communicate said vendor extension that said device accepts.

12. The system according to claim 11, wherein said circuitry is configured to indicate said information as a device property within said vendor extension of said MTP.

13. The system according to claim 11, wherein said circuitry is configured to communicate said information to another device when said device initiates communication with said another device.

14. The system according to claim 11, wherein said circuitry is configured to specify said information in response to a request.

15. The system according to claim 14, wherein said request comprises an MTP operation configured to retrieve said device properties.

16. The system according to claim 14, wherein said response comprises said MTP dataset including said device properties.

17. The system according to claim 14, wherein said request comprises an MTP operation configured to retrieve device property values.

18. The system according to claim 14, wherein said response comprises data from a current value field of said MTP dataset including said device properties.

19. The system according to claim 11, wherein said circuitry is configured to select said vendor extension for communicating to or from said device via an MTP operation configured to set device property values; and said circuitry is configured to communicate to or from said device based on said information.

20. The system according to claim 11, wherein said circuitry is configured to issue an event to indicate when a change to said vendor extension occurs.

21. A non-transitory machine-readable storage having stored thereon, a computer program having at least one code section, the at least one code section being executable by a machine, the machine readable storage comprising:

instructions to specify information associated with a vendor extension of a media transfer protocol (MTP), said information including features enabled by said vendor extension;

instructions to alert a device of said information to allow said device to accept or reject said vendor extension, said device configured to communicate via said MTP, and said alerting occurring via an MTP dataset that includes device properties and an array of unsigned integers in a string indicating said vendor extension and at least one other vender extension said device supports; and instructions to communicate said vendor extension that said device accepts.

22. The non-transitory machine-readable storage according to claim 21, wherein the machine-readable storage further comprises instructions to indicate said information as a device property within said vendor extension of said MTP.

23. The non-transitory machine-readable storage according to claim 21, wherein the machine-readable storage further comprises instructions to communicate said information to another device when said device initiates communication with said another device.

24. The non-transitory machine-readable storage according to claim 21, wherein the machine-readable storage further comprises instructions to specify said information in response to a request.

25. The non-transitory machine-readable storage according to claim 24, wherein said request comprises an MTP operation configured to retrieve said device properties.

26. The non-transitory machine-readable storage according to claim 24, wherein said response comprises said MTP dataset including said device properties.

27. The non-transitory machine-readable storage according to claim 24, wherein said request comprises an MTP operation configured to retrieve device property values.

28. The non-transitory machine-readable storage according to claim 24, wherein said response comprises data from a current value field of said MTP dataset including said device properties.

29. The non-transitory machine-readable storage according to claim 21, wherein the machine-readable storage further comprises instructions to perform one or both of:

selecting said vendor extension for communicating to or from said device via an MTP operation configured to set device property values; and communicating to or from said device based on said information.

30. The non-transitory machine-readable storage according to claim 21, wherein the machine-readable storage further comprises instructions to issue an event to indicate when a change to said vendor extension occurs.

* * * * *